US012023941B2

(12) United States Patent
Ishibe et al.

(10) Patent No.: US 12,023,941 B2
(45) **Date of Patent: *Jul. 2, 2024**

(54) INKJET PRINTER

(71) Applicant: BROTHER KOGYO KABUSHIKI KAISHA, Nagoya (JP)

(72) Inventors: Akinari Ishibe, Toyohashi (JP); Motohiro Momozaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,960

(22) Filed: May 4, 2023

(65) Prior Publication Data

US 2023/0271435 A1 Aug. 31, 2023

Related U.S. Application Data

(63) Continuation of application No. 17/511,143, filed on Oct. 26, 2021, now Pat. No. 11,654,705, which is a continuation of application No. 16/991,482, filed on Aug. 12, 2020, now Pat. No. 11,161,360, which is a continuation of application No. 16/377,467, filed on Apr. 8, 2019, now Pat. No. 10,744,805, which is a continuation of application No. 15/812,006, filed on Nov. 14, 2017, now Pat. No. 10,259,244, which is a
(Continued)

(30) Foreign Application Priority Data

Nov. 27, 2015 (CN) ......................... 201520981492.7

(51) Int. Cl.

| | |
|---|---|
| ***B41J 2/175*** | (2006.01) |
| ***B41J 29/02*** | (2006.01) |
| ***B41J 29/13*** | (2006.01) |

(52) U.S. Cl.
CPC ........... *B41J 29/02* (2013.01); *B41J 2/17506* (2013.01); *B41J 2/1754* (2013.01); *B41J 2/17566* (2013.01); *B41J 29/13* (2013.01); *B41J 2002/17516* (2013.01)

(58) Field of Classification Search
CPC .. B41J 2/17506; B41J 2/1754; B41J 2/17566; B41J 2002/17516; B41J 29/02; B41J 29/13
See application file for complete search history.

(56) References Cited

U.S. PATENT DOCUMENTS

| | | |
|---|---|---|
| 6,102,506 A | 8/2000 | Sasai et al. |
| 6,817,699 B2 | 11/2004 | Hirashima et al. |

(Continued)

FOREIGN PATENT DOCUMENTS

| | | |
|---|---|---|
| JP | 2013-119239 A | 6/2013 |
| JP | 2013-121658 A | 6/2013 |

(Continued)

*Primary Examiner* — Anh T Vo
(74) *Attorney, Agent, or Firm* — Merchant & Gould P.C.

(57) ABSTRACT

An inkjet printer includes a main body. An ink containing unit is disposed in the main body and is configured to contain ink to be supplied. The ink containing unit includes an ink refill portion through which ink is refilled and an ink level display surface disposed on a side surface of the main body. The side surface has an opening through which a jammed sheet is removed and a first cover configured to cover the opening. The ink level display surface and the first cover are juxtaposed on the side surface in a horizontal direction.

13 Claims, 4 Drawing Sheets

Related U.S. Application Data continuation of application No. 15/358,944, filed on Nov. 22, 2016, now Pat. No. 9,821,580.

(56) References Cited

U.S. PATENT DOCUMENTS

| | | | |
|---|---|---|---|
| 7,837,308 | B2 | 11/2010 | Yano |
| 8,955,833 | B2 | 2/2015 | Suzuki et al. |
| 9,463,633 | B2 | 10/2016 | Osakabe et al. |
| 9,821,580 | B2 | 11/2017 | Ishibe et al. |
| 10,259,244 | B2 | 4/2019 | Ishibe et al. |
| 10,744,805 | B2 | 8/2020 | Ishibe et al. |
| 11,161,360 | B2 | 11/2021 | Ishibe et al. |
| 2007/0070146 | A1 | 3/2007 | Hattori et al. |
| 2007/0236552 | A1 | 10/2007 | Suzuki et al. |
| 2008/0246826 | A1 | 10/2008 | Yonekawa |
| 2013/0169720 | A1 | 7/2013 | Nakamura et al. |
| 2013/0208051 | A1 | 8/2013 | Koizumi |

FOREIGN PATENT DOCUMENTS

| | | | |
|---|---|---|---|
| JP | 2013-121660 | A | 6/2013 |
| JP | 2013-121661 | A | 6/2013 |
| JP | 2013-123846 | A | 6/2013 |
| JP | 2013-129082 | A | 7/2013 |
| JP | 2013-136196 | A | 7/2013 |
| JP | 2013-139140 | A | 7/2013 |

INKJET PRINTER

CROSS-REFERENCE TO RELATED APPLICATION

This application is a continuation of U.S. patent application Ser. No. 17/511,143, filed Oct. 26, 2021, now U.S. Pat. No. 11,654,705, which is a continuation of U.S. patent application Ser. No. 16/991,482, filed Aug. 12, 2020, now U.S. Pat. No. 11,161,360, which is a continuation of U.S. patent application Ser. No. 16/377,467, filed Apr. 8, 2019, now U.S. Pat. No. 10,744,805, which is a continuation of U.S. patent application Ser. No. 15/812,006, filed Nov. 14, 2017, now U.S. Pat. No. 10,259,244, which is a continuation of U.S. patent application Ser. No. 15/358,944, filed Nov. 22, 2016, now U.S. Pat. No. 9,821,580, which further claims priority from Chinese Utility Model Application No. 201520981492.7, filed on Nov. 27, 2015, all of which are incorporated herein by reference in their entirety.

TECHNICAL FIELD

The disclosure relates to an inkjet printer, in particular to an ink-refill-type inkjet printer.

BACKGROUND

Known inkjet printers typically print by ejecting ink from a recording head to a recording medium, such as a printing paper. Generally, inkjet printers may be categorized in two categories; one is home printer suitable in private home, and the other is business printer suitable in workplace. The business printers typically have high specification for printing, copying, and scanning and typically print and copy more pages than the home printers, the business printers are relatively large in size to accommodate more complex structures and large-capacity ink cartridges. Because the business printers consume large volume of ink, there may be a need of an ink tank that would contain further large volume of ink than the large-capacity ink cartridge.

SUMMARY

The present disclosure describes an inkjet printer that may avoid various problems caused by using the conventional ink cartridge.

According to an aspect of the disclosure, an inkjet printer may include a main body. An ink containing unit may be disposed in the main body and may be configured to contain ink to be supplied. The ink containing unit may include an ink refill portion through which ink is refilled and an ink level display surface disposed on a side surface of the main body. The side surface may have an opening through which a jammed sheet is removed and a first cover configured to cover the opening. The ink level display surface and the first cover may be juxtaposed on the side surface in a horizontal direction.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments of the disclosure will be described in detail with reference to the accompanying drawings. With reference to an inkjet printer 100, directions of up, down, right, left, front, and rear may be defined with reference to an orientation of the inkjet printer 100 that is disposed in which it is intended to be used as depicted in FIG. 1.

First Embodiment

Figure 1:
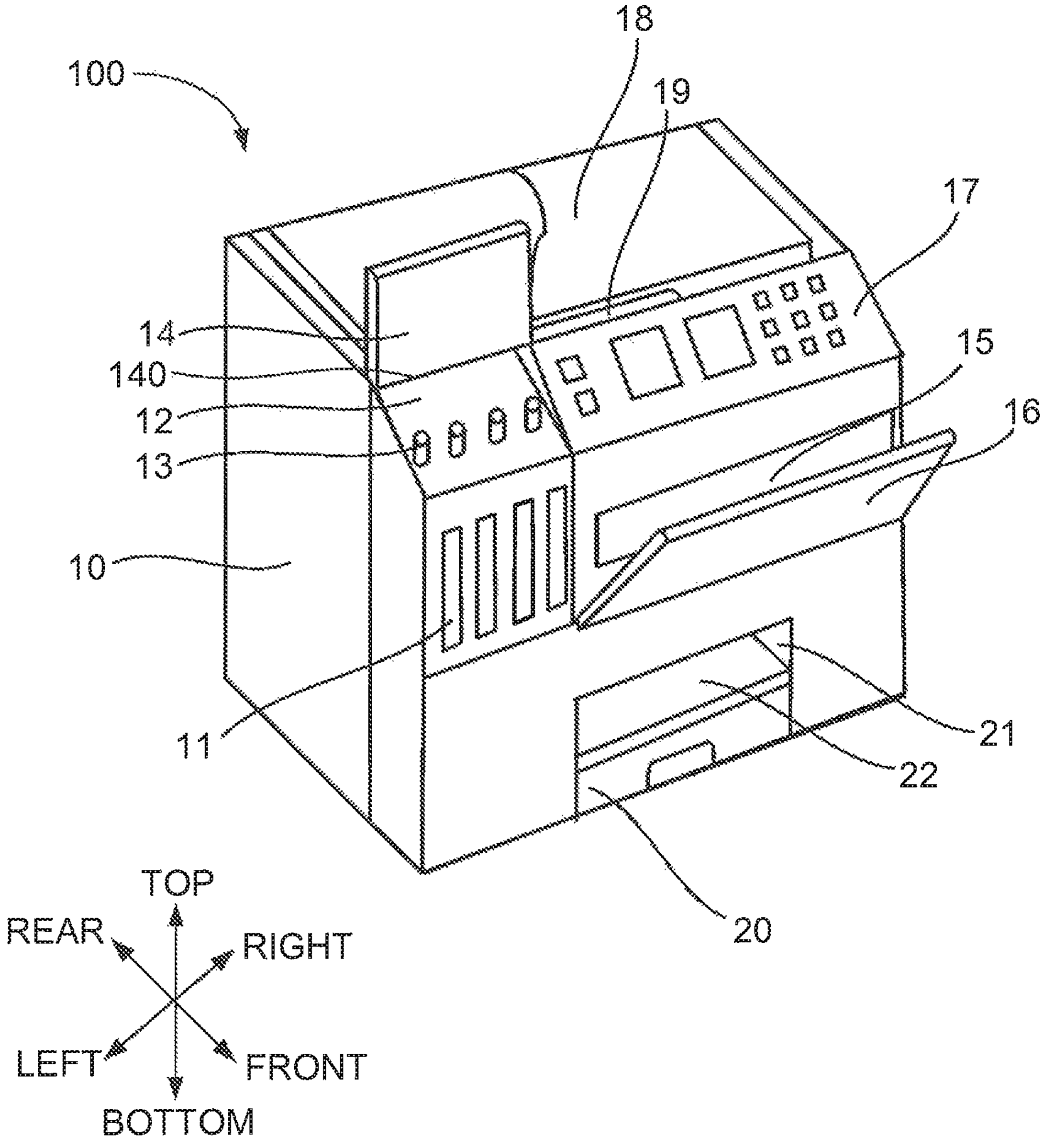
FIG. 1 is a perspective view depicting an inkjet printer, in which a first cover and a second cover are opened, in a first illustrative embodiment according to one or more aspects of the disclosure.
Figure 2:
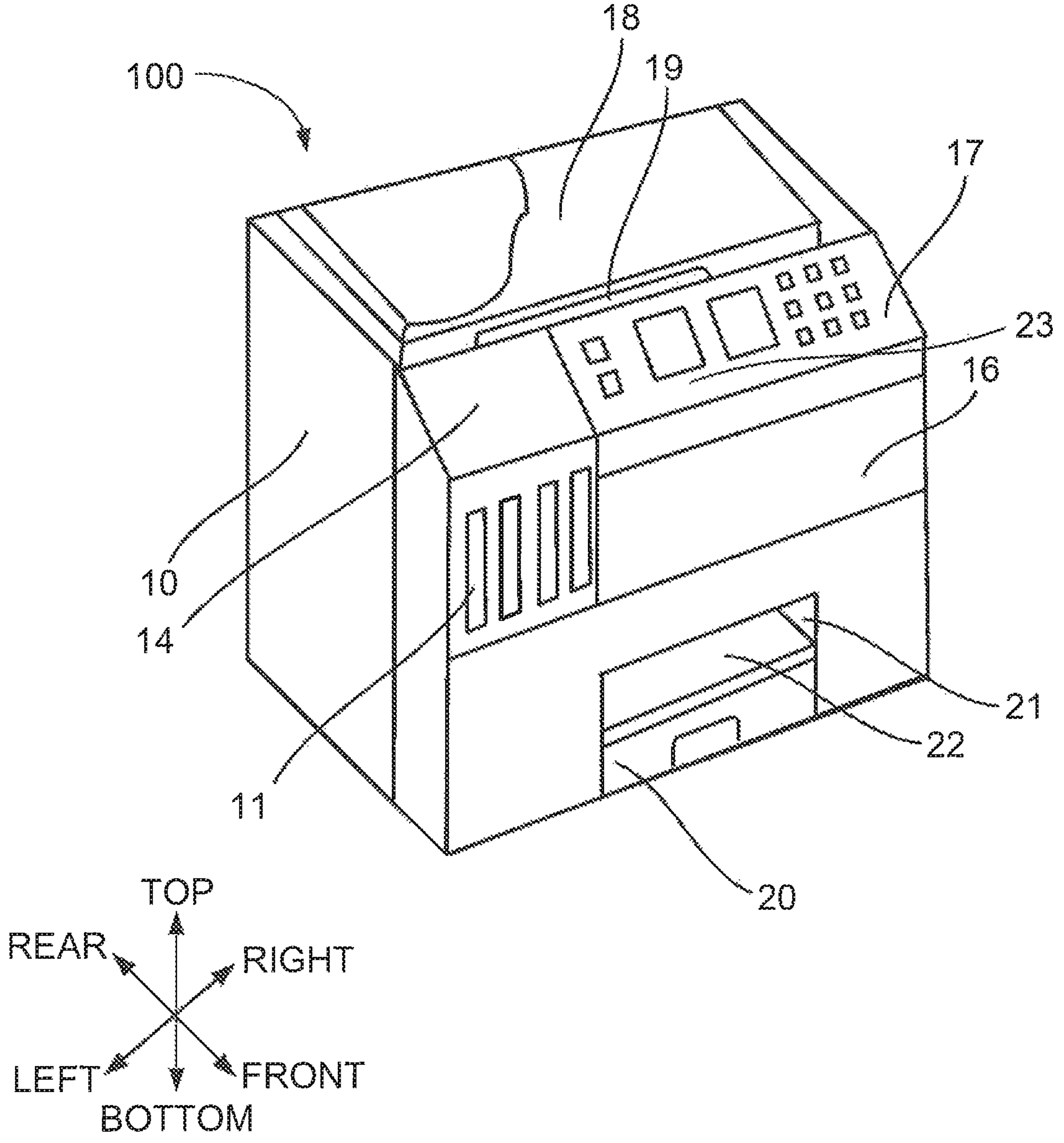
FIG. 2 is a perspective view depicting the inkjet printer of FIG. 1, in which the first cover and the second cover are closed, in the first illustrative embodiment according to one or more aspects of the disclosure.

FIG. 1 is a perspective view depicting the inkjet printer 100, in which the first cover 16 and the second cover 14 are opened, in a first illustrative embodiment according to one or more aspects of the disclosure. FIG. 2 is a perspective view depicting the inkjet printer 100 of FIG. 1, in which the first cover 16 and the second cover 14 are closed, in the first illustrative embodiment according to one or more aspects of the disclosure.

As depicted in FIGS. 1 and 2, the inkjet printer 100 includes a main body 10. The main body 10 exemplarily has a hexahedral shape. For convenience of description, corresponding sides of front, rear, left, right, top, and bottom of the main body 10 are referred to as a front side surface, a rear side surface, a left side surface, a right side surface, a top portion, and a bottom portion, respectively.

As depicted in FIGS. 1 and 2, each of the front side surface, the rear side surface, the left side surface, the right side surface, the top portion, and the bottom portion of the main body 10 is a substantially rectangle-shaped plane. The main body 10 further includes an inclined surface 23 facing diagonally upward and connecting the front side surface and the top portion. Each of the second cover 14 at the closed position and the operating portion 17 is a part of the inclined surface 23.

As depicted in FIGS. 1 and 2, an ink containing unit configured to contain ink to be supplied is disposed in the main body 10. The ink containing unit includes an ink level display surface 11 and an ink refill portion 12 through which ink is refilled. The ink level display surface 11 is disposed below the ink refill portion 12 in a height direction of the main body 10. The ink level display surface 11 is disposed on the front side surface of the main body 10 and is made of a translucent or semi-translucent material through which the ink level in the ink containing unit can be viewed. This structure of the ink level display surface 11 enables the user of the inkjet printer 1 to easily recognize the current ink level in the ink containing unit especially during pouring ink into the ink containing unit. The ink refill portion 12 is disposed on the inclined surface 23 and includes a refill port 13 and a cover 14 configured to cover the refill port 13. The refill port 13 is a tube through which ink is poured into the ink containing unit. The cover 14 is an example of a second cover, and hereinafter referred to as "second cover 14". The refill port 13 may include a sealing member (not shown) configured to seal the refill port. The second cover 14 may be pivotable about a pivot axis 140 provided on the main body 10 so the second cover 14 may be at an open position and a closed position. The pivot axis 140 is located within a length of the operating portion 17 in the height direction of the main body, and especially in the first embodiment the pivot axis 140 is located at the top end of the operating portion 17. When pouring ink into the ink container unit, the second cover 14 should be at the open position. After the ink is filled in the ink container unit, the second cover 14 may be pivoted from the open position to the closed position.

In the first embodiment, the ink refill portion 12 exemplarily includes four refill ports 13, into which ink of different colors, such as black, cyan, yellow and magenta, may be respectively poured, thereby enabling the inkjet printer 100 to print image in a plurality of colors. The number of the ink level display surface 11 is four, identical to the number of the refill port 13. However, it will be appreciated by those skilled in the art that the number of the refill port 13 and the number of the ink level display surface 11 are not limited to four and may be other numbers.

Furthermore, as depicted in FIGS. 1 and 2, the front side surface of the main body 10 has an opening 15 and a cover 16 configured to cover the opening 15. The user may remove a jammed sheet through the opening 15. The cover 16 is an example of a first cover, and hereinafter referred to as "first cover 16". The ink level display surface 11 and the first cover 16 are juxtaposed on the front side surface of the main body 10 in a horizontal direction. The horizontal direction described herein is a longitudinal direction of the main body 10 when the user faces the main body 10. Because the ink level display surface 11 and the first cover 16 are juxtaposed on the front side surface of the main body 10 in the horizontal direction, the user may face the front side surface and be independently accessible to both the opening 15 when removing the jammed sheet and the refill port 13 when pouring ink, thereby improving the usability of the inkjet printer 100.

It will be appreciated that although the ink level display surface 11 and the first cover 16 are coplanar in the height direction of the inkjet printer in the embodiment, both of the ink level display surface 11 and the first cover 16 may not be coplanar in the height direction of the inkjet printer and may at least partially overlap in the height direction. In other words, the context that the two members are "juxtaposed in the horizontal direction" described herein does not mean that the two members are necessarily coplanar in the height direction, but rather includes a configuration that the two members are only partially overlapped in the height direction.

Preferably, as depicted in FIG. 2, when the first cover 16 is closed, the ink level display surface 11 and an outer surface, i.e., the surface facing the user, of the first cover 16 is coplanar, that is, a height of the ink level display surface 11 is identical to a height of the outer surface of the first cover 16 on the front side surface of the main body 10. Thus, when the first cover 16 is closed, the inkjet printer 100 is neat and compact, and because the ink level display surface 11 and the outer surface of the first cover 16 is coplanar when the first cover 16 is closed, the first cover 16 may not easily open unexpectedly by the user to contact the first cover 16 accidentally.

Furthermore, as depicted in FIGS. 1 and 2, the front side surface of the main body 10 is also provided with a sheet feed cassette 20 and a sheet discharge portion 21. The sheet feed cassette 20 is configured to feed a sheet for printing or copying toward the inkjet head (not shown). The sheet discharge portion 21 is configured to discharge the printed sheet. The sheet discharge portion 21 includes a sheet discharge tray 22 configured to receive the printed sheet discharged through the sheet discharge portion 21. In the embodiment, the sheet feed cassette 20 and the sheet discharge portion 21 are juxtaposed in the height direction. Thus, these structures enable the user, facing the front side surface of the main body 10, to conveniently place the sheet feed cassette 20 in an appropriate position, take the printed sheets from the sheet discharge tray 22, and remove the jammed sheets through the opening 15.

Furthermore, the main body 10 is also provided with an operating portion 17 having several keys and displays, through which the user may instruct staring a print job, and setting parameters for printing and copying. Preferably, as depicted in FIGS. 1 and 2, because the operating portion 17 is disposed on the inclined surface 23, the user easily recognizes and operates the keys and displays. Further, the operating portion 17 is separated from and is juxtaposed to the ink refill portion 12 on the inclined surface 23 in the horizontal direction. The front cover 16 is juxtaposed to the ink level display surface 11 in the horizontal direction. Furthermore, as depicted in FIGS. 1 and 2, the operating portion 17 is juxtaposed to the first cover 16 in the height direction of the main body 10. Thus, movement of the front cover 16 may not affect the user to recognize the current ink level when looking at the ink level display surface 11 and to pour ink into the refill port 13.

Furthermore, in the first embodiment, as depicted in FIG. 2, it is preferable that the second cover 14 at the closed position faces diagonally upward, and the operating portion 17 also faces diagonally upward such that the second cover 14 at the closed position and the operating portion 17 are coplanar along the height direction of the main body 10. Thus, the inkjet printer 100 is simple and neat, and the operating portion 17 faces the user, thereby improving the usability.

In the first embodiment, a top portion of the main body 10 is also provided with a scanner 18 for achieving a scanning function. The scanner 18 includes a handle portion 19 through which the user may lift the scanner 18 to place an object to be scanned and remove the object. Furthermore, in the first embodiment, as depicted in FIGS. 1 and 2, a portion of the handle portion 19 is positioned above at least a portion of the second cover 14. Thus, when the second cover 14 is at the open position, the user may unable to access the handle portion 19 to lift the scanner 18, so that the inkjet printer 100 may not change its posture and be stable while pouring ink into the refill port 13.

According to the inkjet printer of the embodiment, the ink containing unit can be replenished with ink by refilling ink via the ink refill portion, thereby overcoming various problems, which are posed when using ink cartridges in the existing printers, such as high frequency of replacement, ease of causing pollution. Further, the ink refill portion and the operating portion are disposed on the inclined surface connecting the top portion and the front side surface of the main body, that is, the ink refill portion and the operating portion are inclinedly disposed on the front side surface, near the top portion, of the printer. Thus, various operations, such as printing, copying, ink-refilling, become highly convenient. Furthermore, because the ink level display surface, the opening through which a jammed sheet is removed, the cover configured to cover the opening, the sheet feed cassette, and the sheet discharge portion are also disposed on the front side surface of the printer, the user can perform various operations at the front side of the printer, with a relatively high operability and usability.

Second Embodiment

Figure 3:
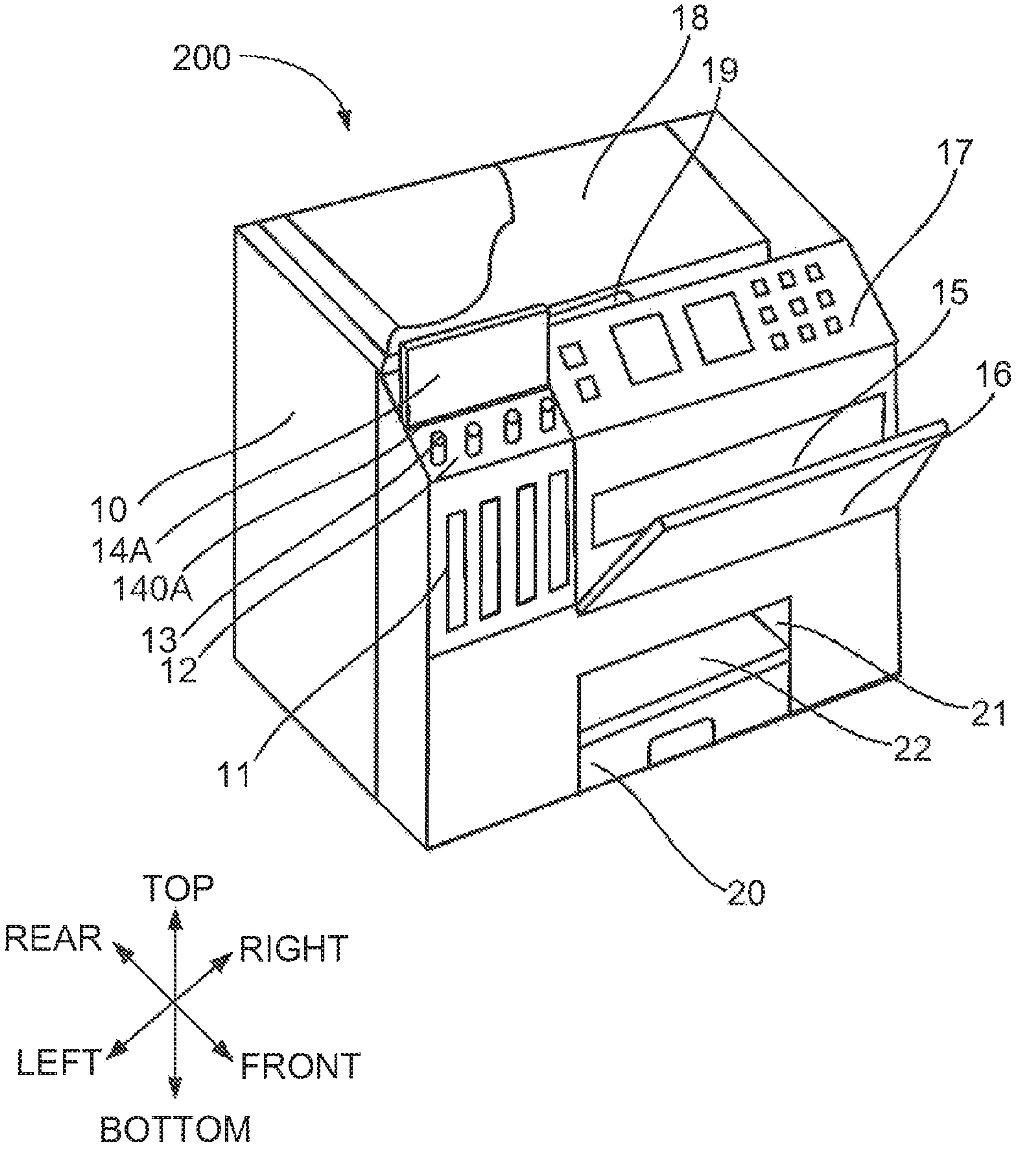
FIG. 3 is a perspective view depicting an inkjet printer, in which a first cover and a second cover are opened, in a second illustrative embodiment according to one or more aspects of the disclosure.
Figure 4:
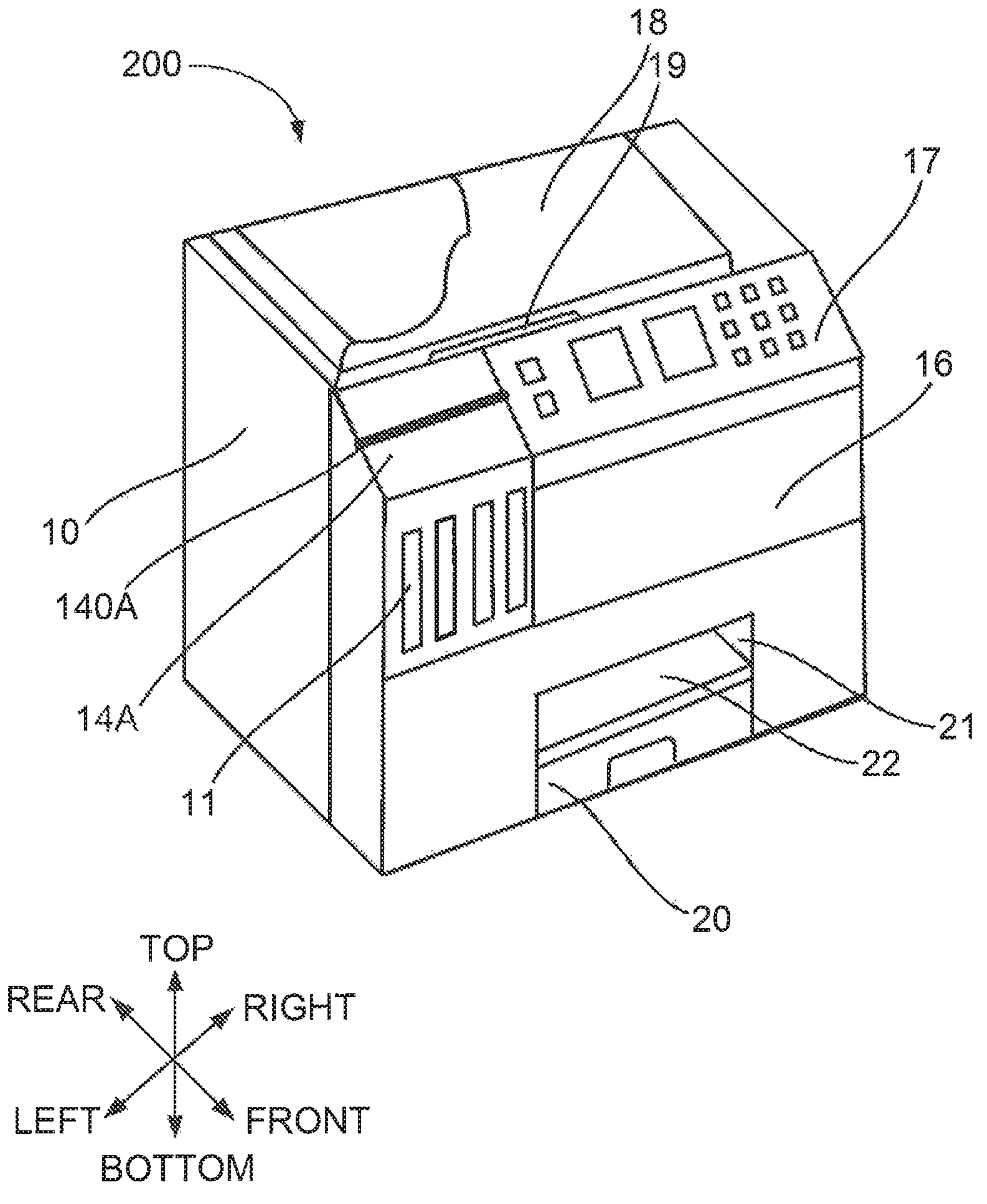
FIG. 4 is a perspective view depicting the inkjet printer of FIG. 3, in which the first cover and the second cover are closed, in the second illustrative embodiment according to one or more aspects of the disclosure.

FIG. 3 is a perspective view depicting the inkjet printer 200, in which the first cover 16 and the second cover 14A are opened, in a second illustrative embodiment according to one or more aspects of the disclosure. FIG. 4 is a perspective view depicting the inkjet printer 200 of FIG. 3, in which the first cover 16 and the second cover 14A are closed, in the second illustrative embodiment according to one or more aspects of the disclosure.

As depicted in FIGS. 3 and 4, the inkjet printer 200 of the second embodiment is substantially the same as that of the first embodiment, except that a pivot axis 140A of the second cover 14A is disposed in a middle portion of the operating portion 17 in the height direction of the main body 10 while the pivot axis 140 is disposed at the top end of the operating portion 17 in the first embodiment as illustrated in FIG. 1. In other words, a length of the second cover 14A, at the closed position, in the height direction is less than a length of the operating portion 17 in the height direction. These structures enable the user to use the scanner 18 while the second cover 14A is at the open position such that pouring the ink into the refill port 13 does not affect the scanning.

While the disclosure has been described in detail with reference to the specific embodiments thereof, these are merely examples, and various changes, arrangements and modifications may be applied therein without departing from the spirit and scope of the disclosure.

What is claimed is:

1. An inkjet printer comprising:

a main body including a side surface;

an ink container disposed on a side of the side surface;

an ink refill portion disposed on the side of the side surface and including an ink refill port communicated with the ink container;

an ink level display disposed on the side of the side surface; and an operation portion disposed on the side of the side surface, wherein the ink refill port is positioned between an upper end and a lower end of the operation portion in a height direction, and the ink level display is positioned below the lower end of the operation portion in the height direction.

2. The inkjet printer according to claim 1, wherein an upper end of the ink level display is positioned below the lower end of the operation portion in the height direction.

3. The inkjet printer according to claim 1, further comprising a cover configured to cover an upper portion of the ink refill portion and including a handle, wherein the operation portion and the handle are arranged in the height direction.

4. The inkjet printer according to claim 1, further comprising a cover configured to cover an upper portion of the ink refill portion and pivotable about an axis between a covering position in which the cover covers the upper portion of the ink refill portion and a standing position in which the cover stands up from the covering position, the axis being positioned away from the ink level display in a horizontal direction.

5. The inkjet printer according to claim 1, wherein the ink container includes the ink refill portion and the ink level display.

6. The inkjet printer according to claim 1, wherein the side surface is a front surface.

7. The inkjet printer according to claim 1, further comprising a sheet cassette having a surface parallel to the side surface.

8. The inkjet printer according to claim 7, wherein the surface of the sheet cassette and the side surface of the main body is coplanar.

9. The inkjet printer according to claim 1, wherein an operating surface of the operating portion is disposed to face diagonally upward.

10. The inkjet printer according to claim 1, wherein an operating surface of the operating portion is fixedly disposed.

11. The inkjet printer according to claim 1, wherein the ink level display is always exposed outside.

12. The inkjet printer according to claim 1, wherein the side surface has an opening communicating with an inner portion of the main body, and the opening and the ink level display are arranged on the side surface in a horizontal direction.

13. The inkjet printer according to claim 1, further comprising a scanner disposed on a top portion of the main body.

* * * * *